Figure 1:
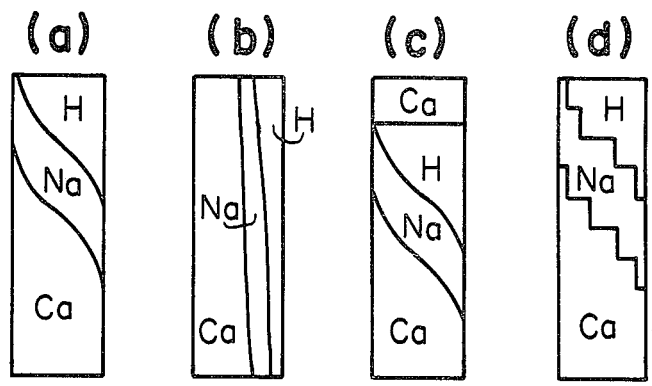

United States Patent [19]

Misumi et al.

[11] 4,126,548
[45] * Nov. 21, 1978

[54] ION EXCHANGE PROCESS

[75] Inventors: Teruyuki Misumi; Toshio Miyaji; Masao Kasai, all of Yokohama, Japan

[73] Assignee: Asahi Kasei Kogyo Kabushiki Kaisha, Osaka, Japan

[*] Notice: The portion of the term of this patent subsequent to Apr. 18, 1995, has been disclaimed.

[21] Appl. No.: 764,855

[22] Filed: Feb. 2, 1977

Related U.S. Application Data

[63] Continuation of Ser. No. 607,692, Aug. 25, 1975, abandoned.

[30] Foreign Application Priority Data

Sep. 9, 1974 [JP] Japan ................................ 49-103747

[51] Int. Cl.² ...................... B01D 15/02; B01D 15/06
[52] U.S. Cl. ........................................ 210/33; 210/35
[58] Field of Search ............ 210/33, 35, 189, 275–279, 210/268

[56] References Cited

U.S. PATENT DOCUMENTS

| | | | |
|---|---|---|---|
| 2,855,364 | 10/1958 | Roberts | 210/275 |
| 2,891,007 | 6/1959 | Caskey et al. | 210/35 |
| 3,130,151 | 4/1964 | Levendusky | 210/33 |
| 3,240,699 | 3/1966 | Duff et al. | 210/275 |
| 3,386,914 | 6/1968 | Hunter | 210/35 |
| 3,459,306 | 8/1969 | Kanamori et al. | 210/189 |
| 3,595,784 | 7/1971 | Butterworth | 210/33 |
| 3,607,740 | 9/1971 | Akeroyd | 210/33 |
| 3,875,053 | 4/1975 | Siegers | 210/35 |

*Primary Examiner*—Thomas G. Wyse
*Assistant Examiner*—Ivars Cintins
*Attorney, Agent, or Firm*—Cooper, Dunham, Clark, Griffin & Moran

[57] ABSTRACT

In a fixed-bed ion exchange process for treating a fluid, wherein adsorption and regeneration are performed in countercurrent flow, the whole ion exchange resins are removed from the ion exchange column portionwise, either intermittently or continuously, subjected to backwash and then returned to the ion exchange column. The whole bed of the resins is replaced by one round in this process, and therefore the distribution of the ions in the resin bed after backwash treatment is substantially the same as before, whereby a very efficient ion exchange is possible without increase in amount of the regenerant.

6 Claims, 6 Drawing Figures

ION EXCHANGE PROCESS

This is a continuation Ser. No. 607,692 filed Aug. 25, 1975 now abandoned.

This invention relates to an improved countercurrent fixed-bed ion exchange process for treatment of a fluid.

For treatment of water by ion exchange process, it has already been proposed to apply a solid-fluid contacting process, comprising passing a fluid to be treated through a treatment zone packed with solid particles in one direction, regenerating the solid particles on depletion in activity by passing a fluid for activation in a direction opposite to the flowing direction of the fluid to be treated, washing the solid particles on contamination by extracting a portion of the solid particles simultaneously with the passing of the fluid to be treated through an outlet arranged in a position opposite to the flowing direction of the fluid to be treated to transport into a washing zone which is furnished separately from the said treatment zone to wash the solid particles and recycling the washed solid particles into the said treatment zone, as disclosed by German Offenlegungsschrift No. 2410276 (laid open on Sept. 19, 1974). This process involves the following advantages:

(a) Because contaminated resins can be extracted and the washed resins can be received without disturbing the bed in the main column, the characteristic of countercurrent system can be realized to its full extent to the advantages of small consumption of regenerant and high purity of the treated fluid.

(b) Treatment of a fluid contaminated to a greater extent is possible without preceding use of a filtration apparatus, because backwash of the contaminated resins can be performed in every cycle. The main column requires no space for backwash and, since the separate wash column is equipped for the purpose of washing contaminated resins only, the apparatus as a whole may be simple and compact to the advantage of cheaper construction cost. Furthermore, the treatment procedure requires no particular time cycle for backwash.

(c) Because the resins, which are extracted from the main column and subjected to backwash, are recycled to the main column through the inlet opposite to the extraction outlet, transportation of resins takes place frequently, preferably in every cycle, in the direction from the cross section of the main column at the recycle inlet to that at the extraction outlet. As the transported resins are necessarily subjected to backwash, there takes place no accumulation of fine particles of abraded resins or impurities brought about by the fluid to be treated and therefore operation can be performed stably with low flowing resistance of fluid.

However, even in this process, when a very large amount of contaminants is carried in by the fluid to be treated, the drawback of increase in amount of regenerant cannot completely be overcome by the backwash operation.

The object of the present invention is to provide a further improved ion exchange process for treatment of fluid.

The present invention provides a countercurrent fixed-bed ion exchange process for treatment of a fluid, which comprises passing a fluid to be treated through a treatment zone packed with ion exchange resin particles in one direction, regenerating the ion exchange resin particles on depletion in activity by passing a solution of regenerant in opposite direction to the fluid to be treated and subjecting the contaminated ion exchange resin particles to a backwash treatment in a backwashing zone which is provided separately from the said treatment zone, being characterized by that said backwash treatment is conducted by removing portionwise, either continuously or intermittently, the contaminated resins from an outlet provided at one side of the said treatment zone to transport into the said backwashing zone and backwash the transported resins therein, and thereafter returning the backwashed resins portionwise, either continuously or intermittently, to the said treatment zone from the inlet provided at the opposite side of the aforesaid outlet until the whole ion exchange resin particles are replaced by one round.

The process of the invention is distinguished from the process of prior art in that the whole ion exchange resins are subjected to the portionwise backwash treatments in the former, while only a portion of ion exchange resins is subjected to backwash treatment, the remaining ion exchange resins being subjected to no such backwash treatment, in the latter.

Figure 2:
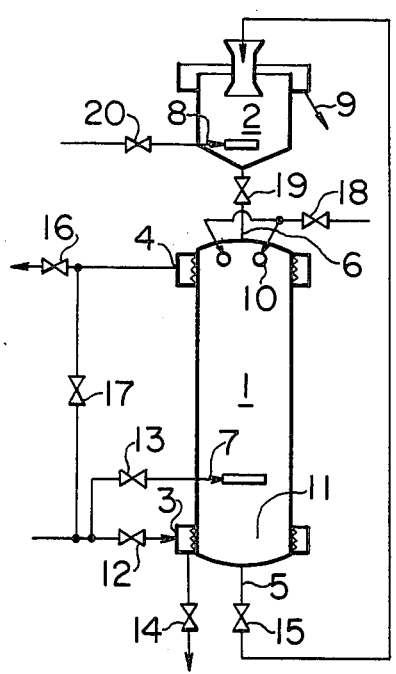
Figure 3:
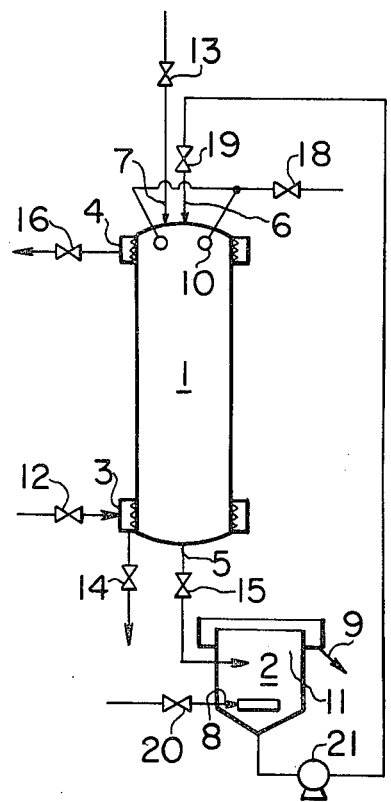

In order that the present invention may clearly be understood and readily be carried into effect, reference is made to the annexed drawings, in which:

FIG. 1 shows various states of ionic distribution in the bed of ion exchange resin particles, wherein (a) is that just after the adsorption treatment; (b) that after the resin particles are backwashed in a fluidized state in the treatment zone according to conventional procedure; (c) that when only a portion of resin particles are backwashed and returned to the bed; and (d) that when the whole resin particles are subjected to backwash and replaced by one round to be returned to the starting position;

FIG. 2 shows a cross-sectional view of one example of an apparatus suitable for practicing the process of the invention; and FIG. 3 shows a cross-sectional view of another example of apparatus.

As is apparently seen from FIG. 1, the present invention overcomes the drawback of increase in amount of regenerant employed which is caused by turbulence of the distribution of various ions in the ion exchange resin bed. In order to carry out an efficient ion exchange which does not increase the amount of regenerant, the ionic distribution is required to be such that Ca ion, which is difficult in regeneration even after washing, should be present at the outlet for regenerant, i.e. at the lower part of the ion exchange column, while H ion, which has a high adsorption capacity, should be present at the inlet for regenerant, i.e. at the upper part of the ion exchange column. In a conventional process, wherein all resin particles packed within the ion exchange column are backwashed in a fluidized state at one time, the distribution of each ion is made uniform by diffusion as shown in (b) to lower efficiency of regeneration. In the process of our prior invention as shown in (c), wherein a portion of the resin particles in the ion exchange column is removed and after backwashing returned to said column, the amount of Ca ion is increased at the upper part of the ion exchange column by the increase in amount of the resins removed. Whereas, according to the present invention, wherein the aforesaid backwash operation is performed, the ionic distribution is as shown in (d) which is substantially unchanged as before the backwash treatment, as shown in (a). Thus, it is possible to effect ion exchange with good efficiency without lowering regeneration efficiency by the backwash operation.

Referring now to FIG. 2 and FIG. 3 which are schematic drawings of cross-sectional view of illustrative apparatus for description of embodiments of the process according to the present invention, FIG. 2 shows one example of apparatus wherein removal and return of the ion exchange resin particles are conducted intermittently and FIG. 3 shows another example wherein removal and return of the ion exchange resin particles are conducted continuously. In these Figures, 1 is ion exchange column; 2 backwash column; 3 inlet for fluid to be treated and outlet for regenerant solution; 4 outlet for fluid to be treated; 5 outlet for removal of ion exchange resin particles; 6 inlet for introduction of ion exchange resin particles; 7 inlet for supply of conveying fluid; 8 inlet for supply of backwashing fluid; 9 outlet for discharge of backwashing fluid; 10 inlet for supply of regenerant solution; 11 device for detection of resin particle level; 12, 13, 14, 15, 16, 18, 19 and 20 are valves for supply or discharge of fluids or resin particles, respectively; 17 valve for circulating fluid; and 21 pump for transportation of resin particles.

In FIG. 2, the fluid to be treated is charged through the valve 12 from the inlet 3 into the ion exchange column 1 packed with ion exchange resin particles and the treated fluid is taken out through the valve 16 from the outlet 4. Regeneration is conducted by charging a regenerant solution adjusted at a suitable concentration through the valve 18 from the inlet 10 and discharging the solution through the valve 14 from the outlet 3. The backwashing of the resin particles is conducted usually after adsorption. A fluid for conveying the resin particles is supplied through the valve 13 from the inlet 7, thereby to pressurize the innerside of the ion exchange column, and at the same time a portion of the conveying fluid is taken out from the valve 4 and circulated through the valve 17 to support the resin bed upper than the inlet 7. Simultaneously, the resins lower than the inlet 7 are removed through the valve 15 from the outlet 5 and transferred into the backwash column 2 until the level of the resins lower than the inlet 7 is as low as the detection device 11, whereupon the valve 15 is closed to stop conveying of the resins. Into the backwash column 2 is charged a washing fluid through the valve 20 from the inlet 8 to backwash the transported resins therein. The backwashing fluid is discharged from the outlet 9. After backwashing of the resins, the valves 13 and 17 are closed and at the same time the valves 14 and 19 are opened, whereby the resins are returned to the column 1 from the inlet 6 while draining fluid from the outlet 3. This operation, comprising supply of conveying fluid, removal of resins, backwashing and return of the resins, is repeated until the resin bed in the ion exchange column is replaced by one round.

When backwashing is conducted in FIG. 3, the fluid for conveying resins is supplied, if desired, through the valve 13 from the inlet 7. The resin particles are continuously removed from the outlet 5 to be transferred to the backwash column 2. The backwashed resins are returned by means of the pump 21 from the inlet 6. The level of the resin particles in the backwash column is controlled by the detecting device 11. If necessary, the fluid discharge through the valve 14 from the outlet 3 is performed at the time of introduction of the resins into the ion exchange column. Other adsorption and regeneration operations are conducted similarly as in case of FIG. 2.

In practicing the process of the invention, the inlets and outlets for ion exchange resin particles are preferably located at both ends of the treatment zone. When one or both of them are desired to be located at a position different from the aforesaid position, they should be positioned such that no or permissible, if at all, increase in amount of the regenerant due to the turbulence of the ionic distribution as mentioned above is caused.

When removal and return of the ion exchange resin particles are performed intermittently in the process of the invention, the amount of the resins removed at one time is preferably not more than one-third of the total amount of the resins. If it is more than one-third, there can be expected no highly efficient regeneration of the ion exchange resin particles and the backwash column is required to be large to a great disadvantage. Furthermore, the inlet for supply of conveying fluid should preferably be located at a position such that the inner volume from the inlet for conveying fluid to the outlet for the resin particles may be from 1.1 to 1.5 times the amount of the resin particles removed at one time.

When removal and return of the ion exchange resin particles are performed continuously, the fluid for conveying the resin particles is used for the purpose of smooth removal of said particles. Therefore, the position for the inlet of the conveying liquid is not limited, but it is usually positioned in the neighborhood of the inlet for introduction of the resin particles.

The backwashing fluid to be used in the present invention is usually water. However, depending on the purpose, other reagents such as solutions of regenerant, regenerant waste or softening agent can also be used.

Various modifications of the present process are possible. For example, ion exchange resin particles other than those in ion exchange column may previously be charged in a backwash column. Furthermore, there may also be provided a flow regulating device such as a porous plate or another column for packing ion exchange resin particles, if necessary, other than the ion exchange column and the backwash column.

EXAMPLE 1

Pure water is produced according to the treatment processes of the present invention as shown in FIG. 2 and FIG. 3, by passing 3.5 m$^3$/hour of an industrial water through a column of cation exchange resins, a column for decarbonization and a column of anion exchange resins in the order mentioned ; each cycle in the ion exchange process consisting of regeneration including rinsing with water, production of pure water and backwashing, the said backwashing being conducted on every cycle. As for the flowing direction of the fluids, regeneration is conducted by down flow. The outlet for the resins is provided at bottom of the column and the inlet for the resins at top of the column. Both continuous removal of the resins (FIG. 3) and intermittent removal of the resins (FIG. 2) are operated on the same scale and under the same ion exchange conditions.

The apparatus and the treatment conditions are as follows:
 (1) Apparatus:
  Column of cation exchange resins:
   298 mm in diameter,
   1900 mm in height;
  Column of anion exchange resins:
   346 mm in diameter,
   1760 mm in height.

(2) Ion exchange resins employed:
  Cationic resins: Diaion SK1B (trade mark: Mitsubishi Kasei Co., Japan), 125 liter;
  Anionic resins: Diaion SA20B (trade mark: Mitsubishi Kasei Co., Japan), 150 liter.
(3) Quality of water to be treated:
  Cations: 125 ppm (as $CaCO_3$)
  Anions (after decarbonization): 81 ppm (as $CaCO_3$)
  Silica: 21 ppm (as $SiO_2$)
  Na %: 30%
(4) Regeneration level:
  Cation: 58 g HCl/liter-resin
  Anion: 36 g NaOH/liter-resin
(5) Removal of resins:
  Intermittent removal: 5 times, 25 liter per each removal, for cation exchange resins; 5 times, 30 liter per each removal for anion exchange resins.
  Continuous removal: Continuous removal for both cation and anion exchange resins

COMPARATIVE EXAMPLE 1

For comparison, two prior art processes are performed. In one process (process A), wherein adsorption is conducted by down flow and balance water is used at the time of regeneration, the height of the cation exchange column is changed to 2500 mm and that of the anion exchange column to 2600 mm, and a room for backwashing is also provided. In the other process (process B), wherein only a portion of ion exchange resins are removed for backwash as disclosed by German Offenlegungsschrift 2410276, 38 liters/cycle of cation exchange resins and 45 liters/cycle of anion exchange resins are removed, respectively. The amount of the resin and other ion exchange conditions are the same as in Example 1.

The results of Example 1 and Comparative example 1 are shown in Table 1:

Table 1

| | Process A | Process B | Present invention Intermittent removal | Present invention Continuous removal |
|---|---|---|---|---|
| Amount of water produced ($m^3$/cycle) | 30 | 48 | 53 | 55 |
| Purity: Conductance (average) ($\mu$V/cm) | 2.4 | 1.5 | 1.5 | 1.5 |
| Silica (average) (ppm) | 0.080 | 0.020 | 0.018 | 0.017 |

EXAMPLE 2

The procedure of Example 1 is repeated by varying the amounts of ion exchange resins to be removed and returned at one time. After every three cycles, said amounts are varied from 1/12.5 to ½ in terms of the ratio of the resins removed and returned over the total resins as shown in Table 2. The results are also shown in the same Table.

Table 2

| Amount of resins removed at one time | | | |
|---|---|---|---|
| Cation resins (liter/cycle) | Anion resins (liter/cycle) | Ratio over total resins | Amount of water produced ($m^3$/cycle) |
| 10.0 | 12.0 | 1/12.5 | 53.7 |
| 12.5 | 15.0 | 1/10 | 53.8 |
| 25.0 | 30.0 | 1/5 | 52.5 |
| 41.7 | 50.0 | 1/3 | 50.7 |
| 62.5 | 75.0 | 1/2 | 44.9 |

COMPARATIVE EXAMPLE 2

The prior art process (German Offenlegungsschrift 2410276) is repeated in the same manner as in process B of comparative example 1 except that the amounts of the resins per one cycle are varied from 1/10 to 1/1 in terms of the ratio over total resins. The results are shown in Table 3.

Table 3

| Amount of resins removed per one cycle | | | |
|---|---|---|---|
| Cation resins (liter/cycle) | Anion resins (liter/cycle) | Ratio over total resins | Amount of water produced ($m^3$/cycle) |
| 12.5 | 15.0 | 1/10 | 49.0 |
| 25.0 | 30.0 | 1/5 | 48.1 |
| 41.7 | 50.0 | 1/3 | 45.0 |
| 62.5 | 75.0 | 1/2 | 39.5 |
| 125.0 | 150.0 | 1/1 | 31.7 |

EXAMPLE 3

According to the process of the present invention by using the treatment system as shown in FIG. 2, copper ions and $HNO_3$ are separated from waste sulfuric acid and recovered, respectively. Regeneration is conducted by down flow. The prior art processes (process A and process B as shown in comparative example 1) are also tested for the same fluid.

The apparatus and the treatment conditions are as follows:
(1) Ion exchange columns:
  process A:
    28 mm in diameter
    2000 mm in height
  process B and the invention:
    28 mm in diameter
    1000 mm in height
(2) Ion exchange resins employed:
  Diaion PK-228 (trade mark: Mitsubishi Kasei Co., Japan), 610 ml.
(3) Quality of fluid to be treated:
  $HNO_3$: 5 wt. %
  $Cu(NO_3)_2$: 1000 ppm (as Cu)
  Turbidity: 490
(4) Amount of regenerant:
  20% $HNO_3$: 770 g/cycle
(5) Amount of resins backwashed:
  process A: 610 ml./cycle
  process B: 240 ml./cycle
  the invention: 102 ml. × 6 times/cycle As the result, the amounts of $HNO_3$ recovered free from copper ions are as follows:
  process A: 8.9 liter/cycle
  process B: 12.2 liter/cycle
  the invention: 17.4 liter/cycle When each of the aforesaid treatments is repeated 20 cycles, the pressure losses at the last time of passing of fluid to be treated at the rate of 12 liter/hour are as follows:

process A: 0.53 $Kg/cm^3$
process B: 1.46 $Kg/cm^3$
the invention: 0.52 $Kg/cm^3$

What we claim is:

1. A process for the treatment of a fluid, which comprises passing a fluid to be treated through an inlet in a treatment tank in one direction, said tank being substantially filled with ion exchange resin particles to effect ion exchange between the fluid to be treated and said particles, regenerating the ion exchange particles in the same treatment tank on depletion of their ion exchange activity by passing a solution of regenerant in the direction opposite the direction of the fluid to be treated, and removing contaminants which accumulate in and on said resin particles during passage of said fluid or said regenerant by backwashing in a tank separate from said treatment tank by portionwise removal of portions containing up to one-third of all of said resins containing said contaminants through an outlet provided at the end of said treatment tank opposite the end at which said regenerating fluid enters the tank, transporting each removed portion of said resins containing said contaminants into the backwash tank, backwashing the transported resins therein, returning said backwashed resins to said treatment tank through an inlet at the opposite end of said treatment tank from which said resins were removed for backwashing and repeating said transporting and returning of successive portions until all of said resin particles have been backwashed and returned to substantially the same original position in the treatment tank, the resins in the vicinity of said outlet being substantially depleted of their ion exchange activity prior to said backwashing.

2. A process as in claim 1 wherein said resins containing said contaminants are removed from said treatment tank and returned thereto continuously.

3. A process as in claim 2 wherein said resins containing said contaminants are removed from said treatment tank and returned thereto prior to regeneration.

4. A process as in claim 2 wherein said resins containing said contaminants are removed from said treatment tank prior to passing the fluid to be treated through the treatment tank.

5. A process as in claim 1 wherein said resins containing said contaminants are removed from said treatment tank and returned thereto prior to regeneration.

6. A process as in claim 1 wherein said resins containing said contaminants are removed from said treatment tank prior to passing the fluid to be treated through the treatment tank.